Figure 1:
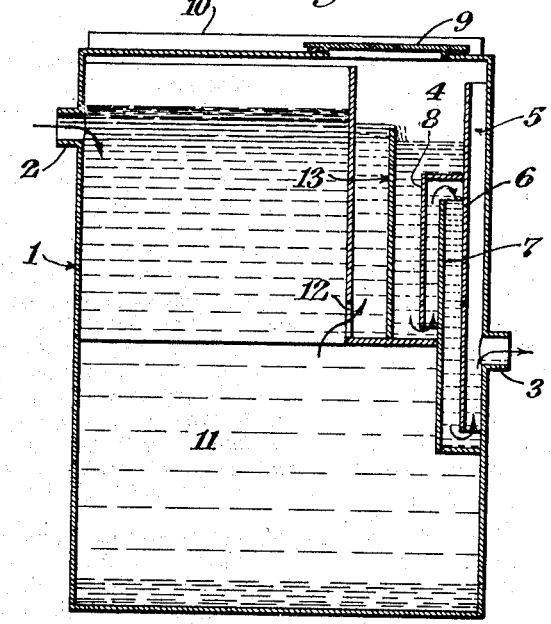

April 27, 1937. E. B. MALLORY 2,078,260
SEWAGE TREATMENT
Filed Feb. 18, 1936

INVENTOR
Edward B. Mallory
BY
Ward Crosby + Neal
ATTORNEYS

Patented Apr. 27, 1937

2,078,260

UNITED STATES PATENT OFFICE 2,078,260

SEWAGE TREATMENT

Edward B. Mallory, Tenafly, N. J., assignor to Lancaster Iron Works, Inc., Lancaster, Pa., a corporation of Pennsylvania Application February 18, 1936, Serial No. 64,450

4 Claims. (Cl. 210—6)

This invention relates to the treatment of sewage and in its preferred forms the invention is particularly adapted to the requirements of individual homes, small groups of homes, road houses, rural schools and other relatively small installations.

The practice of treating sewage wastes in small homes, by using a liquefying or septic tank, is old in the art and its general principles are well-known. For many years septic or liquefying tanks have been used for private home and small institution sewage disposal, in which the sewage is treated by being delivered to an enclosed chamber relatively free from oxygen and in which liquefaction and the activity of anaerobic bacteria digest and liquefy a substantial portion of the suspended solids in the raw sewage. It has also been customary in the employment of this system of sewage treatment to include a separate or so-called siphon chamber for the purpose of providing intermittent discharge of the liquefied portions of the sewage to underground tile drain or leaching areas to prevent a slow and continuous drainage of such liquid into the tile field, with the consequent concentration of such liquids at restricted portions of the tile field, which would thereby be maintained in a moist and soggy condition and give rise to odors and other objectionable features. In the past such siphon chambers have been separate, but associated with the liquefying chamber by means of pipe connections, and accordingly have involved expensive construction costs and in many instances, where separate tanks have been used, natural settlement of the apparatus in the ground has caused opening of joints in the connecting pipe and other difficulties prejudical to the continued satisfactory performance of the equipment.

One of the objects of this invention is to provide equipment of greatly improved durability for efficiently employing the action of anaerobic bacteria and septicization for the purpose above referred to, and at the same time provide a novel and more practicable form of apparatus which may be installed at lower costs.

One important feature of this invention is the consolidation in a single tank structure of the functions of a liquefying or septic tank, a siphon chamber and an automatic discharge siphon, to aperiodically deliver the accumulated liquids in the siphon chamber to a sub-surface tile field or other places of ultimate disposal of such liquids.

Further features of the invention include the provision of an economical and reliable automatic siphon construction for apparatus of the above indicated character.

It has also been frequently customary in the art to construct liquefying tanks and/or siphon chambers of concrete, which necessitated the erection of suitable forms and the employment of specialized labor for such erection and the additional cost of fittings, generally cast iron, to serve the various well-known purposes. On the other hand, this invention in its preferred form is readily adaptable to steel construction, with complete and economical factory assembly in a permanent form.

Further and more specific objects, features and advantages of the invention will more clearly appear from the detailed description given below taken in connection with the accompanying drawing which disclose by way of example one embodiment of apparatus which may be used in the practice of the invention. The invention consists in such novel features and combinations as may be shown and described in connection with the equipment herein disclosed as an illustrative example. In the drawing, Fig. 1 comprises a vertical central sectional view of a complete apparatus unit involving my invention, and Fig. 2 is a top view of the apparatus of Fig. 1.

Figure 2:
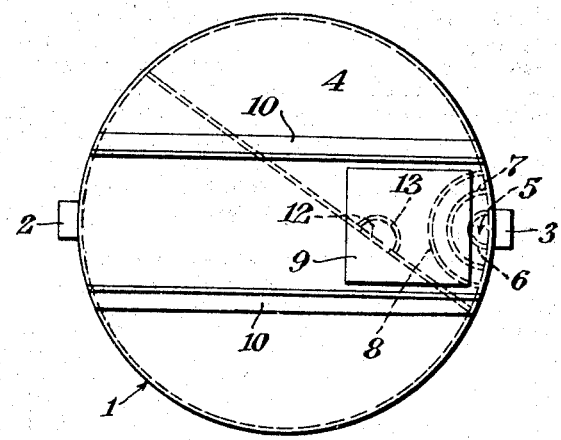

Referring to Fig. 1, a vertical cylindrical steel tank is indicated at 1 with an inlet opening 2 and an outlet opening 3. Within this tank I have illustrated one form of siphon chamber 4 preferably formed of sheet steel fabricated in connection with the manufacture of the tank assembly as a permanent part of the unitary assembly. An automatic discharge siphon 5 is also shown associated with the siphon chamber and may consist of a central or inner tube 6 open at its top for the purpose of venting, an intermediate tube 7 closed at its bottom to provide a trap, and an exterior concentrically arranged tube 8 closed at its top to form the equivalent of the air bell of a typical siphon.

The chamber 1 as shown may be provided with a cover 9 at the top, of suitable size and shape, but preferably so located and of such size that access may be had to the siphon chamber 4 as well as the main tank 1 to permit the withdrawal of accumulated solids when such becomes necessary. It will be evident that tanks of this character of relatively large diameter may be provided with reinforcing members as at 10 suitably arranged to assist in supporting the weight of the superimposed earth covering the tank after installation, and any additional loads on the surface of the ground such as motor cars or wagons in the event that the tank is located under a driveway or the like.

Inlet opening 2 preferably consists of a collar into which the spigot end of a conventional sewage pipe of either cast iron or tile construction may be inserted and cemented or leaded into tight engagement to prevent leakage of the sewage at this point. Outlet 3 is of similar form and construction and adapted to receive the spigot end of a tile or cast iron soil line for the purpose of conducting the liquefied portions of the sewage from the tank to the tile field.

Fig. 2, which is a top view of the preferred form of the apparatus, illustrates more clearly the general arrangement and disposition of the siphon chamber 4, its inlet tube 13 and the concentric siphon ducts 6, 7, and 8. The siphon chamber inlet tube 13 is preferably located at a point substantially diametrically opposite the inlet port 2 to avoid direct passage of raw untreated sewage from the inlet port to the siphon chamber through port 12 and duct 13. The automatic siphon 5 and the outlet port 3 are also preferably located diametrically opposite from the inlet port 2 to facilitate construction and installation of the whole assembly in a straight line from the soil line exit from the building to the area selected for the tile field, thus avoiding undesirable use of elbows or bends in either the inlet or the outlet soil lines.

It will be evident from the description and drawing that the entire assembly of the main tank and all associated parts or portions may be of a welded steel construction with no bolted, hinged or other movable joints, thus providing a construction of great strength and durability at low cost. It will be further evident that all parts of the assembly may be welded to and the weight thereof carried by the walls of the main tank. Furthermore, the division wall for forming the siphon chamber 4 may comprise a flat steel plate as shown, and all of the several ducts 6, 7, 8, and 13 may comprise semi-cylindrical sheet steel members of simple and inexpensive construction which may be easily welded in place as shown.

In operation, sewage containing suspended solids and other digestible matter enters through the inlet port 2 into liquefying chamber 11, in which the process of liquefaction and digestion of the sewage solids is continuously maintained by the action of anaerobic bacteria normally indigenous in the sewage solids. The absence of appreciable quantities of oxygen in this chamber encourages the propagation and multiplication of anaerobic organisms, building up substantial numbers thereof in adequate proportion to the amount of sewage normally delivered to the tank to provide the most expeditious digestion and liquefaction of the sewage solids entering the tank. In the process of treatment, settleable suspended solids entering in the tank through port 2 settle to the bottom of the tank and are immediately atacked by the anaerobic organisms and the process of liquefaction initiated. It is well-known that during this process of digestion and liquefaction, gases are evolved which become entrained in the solids, rendering them buoyant, and causing them to float slowly upward through the body of liquid in the tank to the surface. Many of these floated particles, particularly those of cellulose origin or structure, digest much more slowly than solids of protein or carbohydrate origin and character, resulting in the formation of a scum at the surface of the liquid contents of the tank, in which the action of selective groups of bacteria and protozoa and major organisms is carried on. Through the process of ingestion and digestion highly comminuted and substantially digested solids result. These solids have a higher specific gravity and accordingly return by settlement to the bottom of the tank where continued comminution and disintegration and liquefaction occur through the action of other selective groups of anaerobic organisms. Due to the presence of quantities of oxygen in dissolved form in the sewage entering the tank and the difference in the density between oxygenated water and inert water, those molecules of oxygen which do not immediately enter into chemical reaction and become converted into carbondioxide and other products of oxidation and reduction, rise to the surface and pass into the interstices of the scum layer, causing a tendency to incrustation or to the formation of a semi-rigid porous crust, superimposed over the more viscous portions of the scum layer. This crust may be of more or less permanent character and persists without material disintegration for a period of years, serving however the purpose of supporting the anaerobic conditions in the main liquid body of the tank.

As the liquid portions of the sewage entering the tank and the products of liquefaction resulting from the anaerobic organism activities, accumulate in the central zone of the tank between the scum layer at the top and the sludge blanket or settled solids layer at the bottom, they pass by normal flow through opening 12 and upwardly through duct 13 into siphon chamber 4. As siphon chamber 4 becomes filled to a predetermined level, the automatic siphon operates to discharge the contents of the siphon chamber down to the level of the open end of outer siphon tube 8, this liquid content of the siphon chamber passing out through outlet port 3 into a conventional tile field, or in some instances, to the receiving water of the region.

If desired, the bottom wall of the siphon chamber 4 may be inclined upwardly toward the center of tank 1 to facilitate the progress of solids in their travel from the lower part of tank 1 toward the surface scum area. However, except possibly in larger installations, the circulation of the liquid will prevent any excess accumulations of solids beneath the bottom wall of the siphon chamber with the construction as shown in the drawing.

It will be evident that small quantities of substantially digested solids will be entrained in the central zone of liquid and pass into the siphon chamber in the manner described. These solids will similarly be precipitated to the bottom of the siphon chamber or rise to the surface, depending upon the state of their digestion. Those particles of solids which settle on the bottom of the siphon chamber will continue to digest through the action of selective organisms and further liquefaction will occur, with the result that the liquid passing out of outlet port 3 in a well designed and properly proportioned apparatus of this character, will have a relatively low suspended solids content.

While the arrangement and ventilation of the tile field is a part of the complete system of disposal in its preferred form, I do not claim any novelty or invention with regard thereto. In my preferred application of this system however, it is desirable to provide a means of venting the tile field to the atmosphere with one or more suitably arranged ducts or pipes, preferably arranged in such manner that the rush of liquid into the tile field from the tank will induce into the underground tile lines substantial quantities of air containing oxygen. The liquids and solids passing from the siphon chamber under proper conditions of design and construction and operation are in suitable condition to be further disintegrated and rendered innocuous by action of aerobic bacteria and the process of oxidation and reduction. It will be evident, therefore, that a simple and relatively complete system of sewage purification may be provided by the use of this invention, in which the apparatus is entirely self-contained and in which intermittent action of desirable parts of the cycle are provided without the use of any movable dissociated or wearing parts.

Certain portions of the suspended solids occurring in normal sewage and delivered to the tank in the usual practice of this invention reach a final degree of digestion and comminution with the remainder of a residue which settles and collects in the bottom of liquefying chamber 11. After a number of years of operation this collection of sediment may accumulate to excessive proportions and it is conventional practice to open the top of the tank and by means of a suction hose and pump, or other means, remove a substantial portion of this sediment, leaving however a sufficient quantity of sediment containing anaerobic organisms to insure the active and suitable digestion of additional quantities of sewage delivered to the tank. In like manner, a small amount of sedimentation may occur in siphon chamber 4 and for the purpose of removing the sediment in either of the chambers mentioned, I preferably provide a covered opening through which access may be had to either chamber for the purpose of removing such sediment.

With certain classes of sewage, particularly those having a relatively high cellulose content, such as arising from kitchen sink wastes in the warm seasons of the year when relatively great quantities of raw vegetable matter is washed into the discharge line, relatively great quantities of gas will be developed in the liquefying or digesting chamber 11, which will rise to the surface of the liquid and after penetrating the scum layer will accumulate in the top of the tank above the scum layer. Unless suitable means are provided it would be possible, under extreme conditions, to create pressures which might dislodge the cover and permit the covering earth to enter the tank or force liquid out of the tank to the tile field prematurely. To relieve this pressure the open upper end of inner concentric tube 6 of siphon 5 serves as a gas outlet and permits the gas so accumulated to pass out into the underground tile line and be dissipated through the ground area or through such venting means as may be provided in the tile field.

A particular advantage in this form of construction is represented by the convenience and economy of installing this tank at the point of use. It will be evident that a simple circular excavation at some point in the line of soil pipe traverse, is the sole requirement and that functions of the plumber who normally installs the soil line within and without the building are sufficient to complete the installation of this tank, avoiding the necessity of employing carpenters to erect forms and concrete artisans to cast concrete tanks and other expensive elements of conventional practice. It will also be evident that the practice of providing a siphon chamber as a separate tank unit connected with the main liquefying tank through a pipe line is avoided, thereby avoiding the possibility of settlement of either of the tanks and avoiding openings in the connecting line, which would result, permitting leakage and unsatisfactory sanitary conditions. It will be further evident that this unit is substantially sealed and self-contained and therefore provides a generally improved sanitary device for the purposes stated.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In combination with a sheet metal tank, a siphon comprising a plurality of channel-shaped sheet metal members spaced apart, one within another, said members having their longitudinal edges fixed to a wall of the tank to provide a plurality of conduit cavities, one within another and between said members respectively and said wall, one of said cavities being arranged to provide an up-flow intake for the siphon, a second of said cavities being arranged to provide for the down-flow of liquid from the top of said intake cavity, and a third of said cavities forming an up-flow outlet cavity communicating with the lower end of said down-flow cavity and with the exterior of the tank, the upper end of said third cavity being open and extending above the liquid level in the tank to provide a vent from the space above the liquid, to the outlet.

2. Apparatus for sewage treatment comprising a closed sheet metal septic tank, a partition in said tank for forming a siphon chamber within the tank walls as a permanent part of a unitary assembly therewith, a wall portion of said tank also comprising one of the side walls of said chamber, means for conducting liquid from said tank at a point intermediate its upper and lower portions, into the upper part of said siphon chamber, a siphon within the tank and mounted on said wall portion, and forming a part of the permanent unitary assembly of the apparatus for drawing off liquid from the siphon chamber at intervals when the latter becomes filled to a predetermined level, an outlet through said wall portion, a trap between said siphon and said outlet, and a vent conduit extending from the space above the normal liquid level in the tank to said outlet.

3. In combination with a generally cylindrical sheet metal tank, a siphon comprising a plurality of channel-shaped sheet metal members spaced apart, one within another, said members having their longitudinal edges fixed to an inside wall of the tank to provide a plurality of conduit cavities, one within another and between said members respectively and said wall, one of said cavities being arranged to provide an up-flow intake for the siphon, a second of said cavities being arranged to provide for the down-flow of liquid from the top of said intake cavity, a third of said cavities forming an up-flow outlet cavity communicating with the lower end of said down-flow cavity, the lower portions of said second and third cavities forming a trap following the siphon, said third cavity communicating with the exterior of the tank at a level adjacent the level of the intake of said first cavity, a partition in said tank for forming a siphon chamber within the tank walls as a permanent part of a unitary assembly therewith, the wall portion of said tank carrying said channel members also comprising one of the side walls of said chamber, and means for conducting liquid from said tank at a point intermediate its upper and lower portions, into the upper part of said chamber.

4. Apparatus for sewage treatment comprising a closed sheet metal septic tank of substantially symmetrical shape externally, a partition in said tank for forming a siphon chamber within the tank walls as a permanent part of a unitary assembly therewith, a wall portion of said tank also comprising one of the side walls of said chamber, means within the tank for conducting liquid from said tank at a point intermediate its upper and lower portions, into the upper part of said siphon chamber, a siphon within the tank and mounted on said wall portion, and forming a part of the permanent unitary assembly of the apparatus for drawing off liquid from the siphon chamber at intervals when the latter becomes filled to a predetermined level, an outlet through said wall portion, and a trap mounted on the inside of said wall portion between said siphon and said outlet.

EDWARD B. MALLORY.